June 5, 1956    A. DAVIS    2,748,717
FLUID PUMPING DEVICE
Filed Jan. 22, 1953
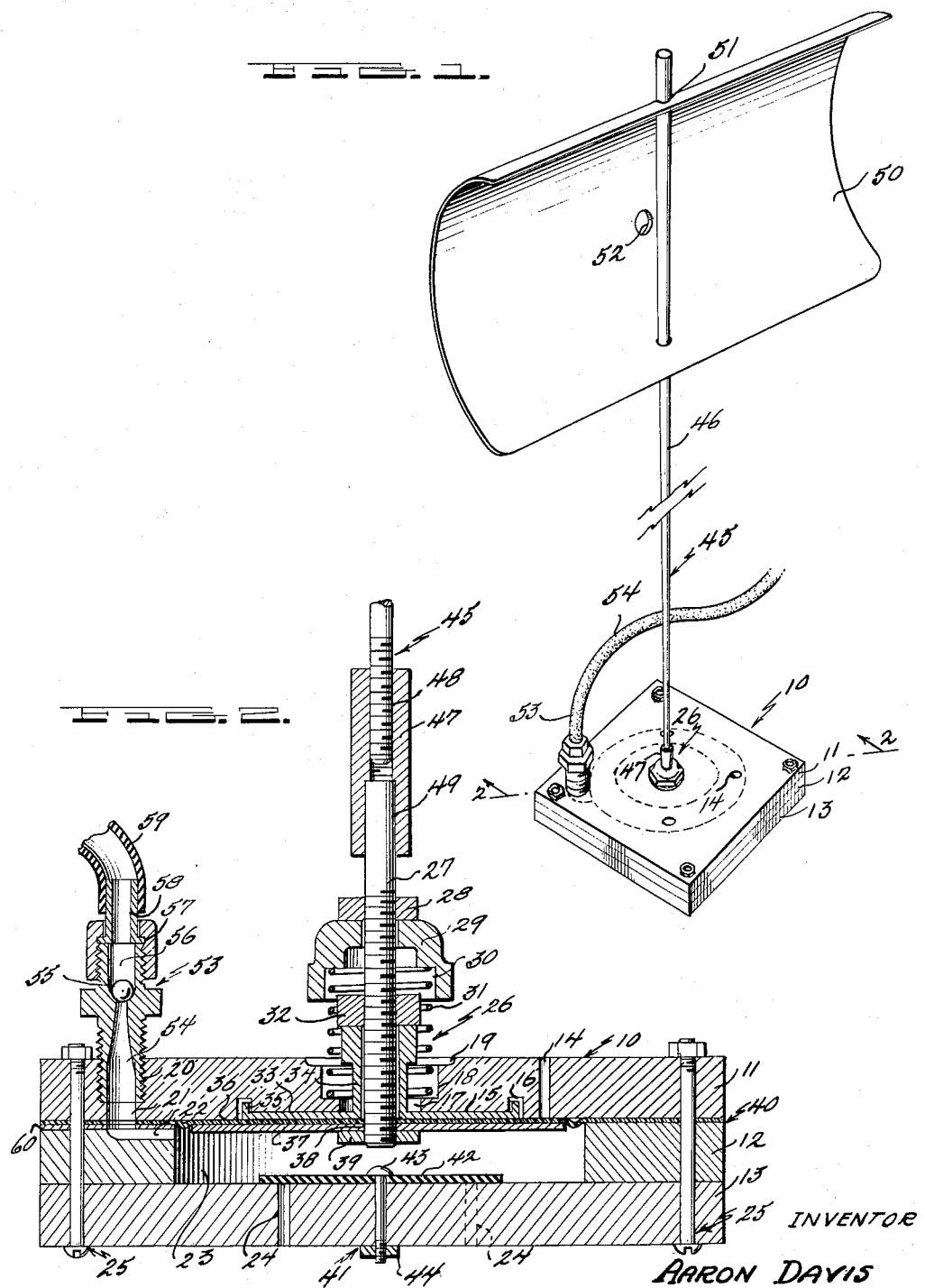
INVENTOR
AARON DAVIS
ATTORNEYS United States Patent Office 2,748,717
Patented June 5, 1956

2,748,717
FLUID PUMPING DEVICE

Aaron Davis, Harwichport, Mass.

Application January 22, 1953, Serial No. 332,723

4 Claims. (Cl. 103—152)

The present invention relates to pumping devices and has particular reference to means for harnessing the varying pressures or pulsations of natural winds and the like to effect pumping from vessels, containers and other like receptacles wherein fluids accumulate.

A great deal of effort has been expended toward the development of windmill pumps and similar instruments for withdrawing water from wells, vessels and other receptacles of water. For instance, it is well known that inventors have constructed windmills which oscillate about a bearing to actuate by crank piston-like pumping means and/or mechanical apparatus adapted to effect motor movement to pumping elements.

To effect pumping of bilge water and other leakage and deposited fluids from vessels, numerous natural and inverted pendulum-like pumping devices have been conceived wherein pumping has been effected either through diaphragm or piston pumps. Such instruments operate upon the rolling and pitching motions of vessels. The disadvantages in pumping devices of this nature become obvious where it is required to place the pendulum great distances from the pump. Such devices are cumbersome and inefficient in unfrequented waters.

It has been learned that over an average, given period of time there are at least four hours of wind during the day. Such natural wind is not a constant wind, but rather has varying pressures and velocities such as create fluctuating pulsations. Considering the varying pressures and velocities of the winds upon bodies of water and even upon land, the present invention has been conceived with a view toward employing this variance in pressure or velocity to work a pump of the diaphragm type.

It is therefore an object of the invention to provide novel means for effecting pumping of fluids from vessels, receptacles, containers and the like through the employment of the natural varying pressures and/or velocities of winds.

It is another object of the invention to provide mechanical means for transmitting varying pressures and pulsations of winds from a point above a pump through a fulcrum thereof to effect working of a diaphragm like pump.

Yet another object of the invention is to provide mechanical means for automatically orienting the gathering element of a wind operated pumping device such as obtains power from the varying pulsations of wind and other associated elements.

A still further object of the invention is to provide simple means within a wind actuated pump for effecting greater and/or lesser power adjustment to the said pump.

Still another object of the invention is to provide a novel, simple, compact and readily dismountable pumping device of the type operable through the varying pulsations of winds.

Yet another object of the invention is to provide means for effecting stabilization to a pump diaphragm such as may be used in a wind operated pump, the stabilizer means effecting even distribution of pumping pressures to the pump itself.

An advanced object of invention resides in the provision of a novel pumping device having a relatively compact housing, the essential elements of control of which are mounted so as to permit maximum pumping chamber space within a construction of minimum size, the device being especially suited to confined quarters as for instance in small pleasure craft.

Other more apparent objects of the invention will become clear upon reference to the drawings and following description.

For purposes of illustration drawings are attached hereto wherein figures in the drawings are made the subject of description hereinafter.

In the drawings:

Figure 1 is a view in perspective of the invention; and

Figure 2 is a cross sectional view of the invention taken along the lines 2—2 of Figure 1.

As shown in Figure 1, the invention comprises the several parts including a base 10 which may be made of any suitable readily sealable material such as a hardened plastic or Bakelite material. In the preferred embodiment of the invention the base pump housing 10 may be made of three plates or blocks, each of which is provided with varying recesses forming guide channels for working elements and the pump chamber. In Figure 1, each of these block elements is labeled 11, 12 and 13, respectively, block 11 forming the uppermost of the portions of the pump, and block 13 the lowermost. It has been found desirable to construct the device from blocks superposed one upon another. Still other constructions embodying the same general principles of construction might be formed without departing from the invention as described.

In Figure 1 there is also shown an adjustable lever assembly 26 in extension of the pump and a mast 45 adapted to removably seat a vane 50. This figure illustrates the assembled device in working condition.

Referring to Figure 2, block 11 defines a plurality of apertures 14 extending through the block from the upper face thereof to the lower face. It is desired to permit atmospheric pressure to be directed toward the uppermost portion of the diaphragm 36 of the pump and the distribution of ports 14 about the diaphragm face as shown permits even direction of atmospheric pressure upon the diaphragm.

A circular recess 15 is concentric with deeper wheel-like recess 16 in the lower central portion of block 11. Recess 16 is tooled outwardly from the lower surface of the block toward the upper surface 15. Communicating with recess 16 is a cylindrical aperture 17 and aperture 18, of greater diameter. The apertures are adapted to confine lever assembly elements of the pump upon plunging and during operation. Recess 19 assures the rockable positioning of a retainer cap 29 and spring on the surface of the block 11.

Through block 11 there is provided a threaded aperture 20 and cylindrical chamber 21 in the lower portion of the block. The aperture and cylindrical chamber form part of a channel which communicates the pumping chamber with a check valve hereinafter described.

Block 12 is provided with a horizontally extending depression 22 upon its upper face, depression 22 aligning with the corresponding chamber 21 of block 11. The inner opening of this depression 22 communicates with a cylindrical chamber 23, which chamber forms the main chamber of the pump. Block 13 has a plurality of vertical apertures 24 directed radially about the central portion of the block. These apertures 24 form fluid intake ports of the pump.

Any suitable securing assembly 25 may be provided for clamping the blocks against movement. Clamping means may be employed as well as nut and bolt assembly. In either event, however, the securing assembly must have sufficient strength to enable sealing the blocks one against another. Likewise, it is desirable to have the securing assembly form stanchions to maintain the pump assembly in spaced relation to supporting surfaces of vessel or receptacle bottom.

A lever plunger assembly 26 is shown in both Figures 1 and 2. The specific elements of the invention are shown in Figure 2 wherein a lever plunger shaft 27 has a threaded portion extending throughout its lower extremity. At the uppermost extremity of lever plunger 27, a lock screw 28 may be positioned, which lock screw provides for the seating of the exterior elements of the lever plunger assembly which include a cap 29 having a recess 30 and a compressible spring 31 adapted to seat within the cap screw recess 30 and to rest upon the shoulder formed by recess 18 of block 11. Partial compression of the spring forces the part of diaphragm and its surrounding plates against the inner surfaces of plate 11 forming a top wall of the pump. The action will be such as to cause lever movement to the working parts.

It is preferred to employ a disc 33 to form the uppermost portion of the diaphragm of the pump. Disc 33 has an extended tubular member 34 which is directed upwardly along the lever 27. The disc 33 has an annular flange 35 extending peripherally thereabout, which flange is adapted to seat within the recess 15 of block 11 when in battery.

Diaphragm 36 is movably held as at 40 within the chamber by the discs 33 and 37 of the pump. The diaphragm may be made of any suitable resilient plastic material having desired wear properties. Disc 37 is preferably of increased diameter with respect to plate 33. The diameter of disc 37 is, however, insufficient to completely cover the circular housing forming a chamber for the pump. Discs 33 and 37 having tube 34 and aperture 38, respectively, are secured to the lever 27 through compression by the lock screw 28 approximately midway of the threaded portion of lever 27 and lock screw 39 at the lower extremity of the threaded portion of the lever.

Chamber 23, as is shown in Figure 2, contains the working part of the diaphragm and the inlet valve assembly 41 which is employed in the operation of the instrument. Inlet valve 42 may be fastened within the chamber and particularly to block 13 through the engagement of a bolt 43 with the resilient valve 42. The bolt is secured through an aperture in the block through engagement as at 44.

In Figure 1 of the drawings a mast assembly 45 is illustrated, which comprises a mast portion 46 having a tubular extension 47 threadedly engaged with its lower portion. The tubular extension 47 is provided with internal threading 48 at its upper extremity and smooth tubular structure at its lower extremity. The tubular extension enables rotatable seating of the mast assembly with the lever plunger 27.

A vane 50 may be secured to the mast 46 through engagement of apertures 51 with the mast. The vane 50 may be made of a flexible metallic like or plastic substance which when bent or corrugated aligns apertures 51 with the mast 46. Such a flexible vane is desirable for dismounting and storing during inoperative periods. As shown in the drawings, an aperture 52 is bored centrally of the vane to allow passage of winds therethrough assisting in orienting the vane and mast.

A check valve assembly 53 is shown in both drawings at the left side of the instrument, the check valve comprising the detailed elements shown in Figure 2. In this figure a threaded valve chamber 54 connects with aperture 21. The check valve may be of conventional type having a ball 55 within a restricted aperture and a chamber 56 and ball stop set therein. A lock nut 57 may be employed to force an extension nozzle 58 against the valve assembly 53 and any convenient conduit 59 may be employed to transfer the fluids outwardly.

A template shim 60 is placed between the diaphragm 36 and the upper portion of block 12, which shim enables the sealing of the junction between the chambers 21 and 22 of blocks 11 and 12, respectively.

It will be noted that the items employed to secure the blocks together and to form a sheet for the intake valve of the invention provide stanchions upon which the entire device may rest. These stanchions numbering five in the present innovation, provide a relatively stable seat for the device. Thus the instrument may be seated in the bottom of a craft where bilge water and the like collects or in the bottom of a receptacle containing water or other liquids. The basic element of the invention having been seated, a flexible tubing 60 having been positioned upon the check valve, and a relatively long mast and vane assembly 45 having been joined to the base element, the invention is now ready for operation.

As previously indicated, the operation of the invention is wholly dependent upon the varying pulsations and/or fluctuations of natural winds such as occur on water and on land. As the pulsations of the wind vary, so will the pumping motions accomplished by the operation of this device cause the pumping of water from a receptacle and/or vessel outwardly thereof.

The vane and mast by reason of their peculiar construction are self-orienting so that upon variation in direction of wind the instrument will be positioned for operation. The natural orientation of the vane and mast elements of the device are obtained exclusively of the placement of the basic pumping element of the invention.

If the mast assembly is of sufficient length, the very slightest pulsations of wind will effect operation of the device. Of course the ability of the device to pump is determinate not only upon the length of the mast assembly and the area of the vane, but also upon the amount of compression which has been made on the spring 31 by adjustment of the locking nut 28 against the cap which secures the spring.

In operation the mast assembly will oscillate about the restrained point indicated by the numeral 26 in the figures of the drawing. Here the action of the lever plunger 27 is restrained by reason of the counteraction of the spring 31. Upon oscillation of the mast assembly, the lever plunger will oscillate about the restrained point compressing one portion of the spring and thereupon depressing a portion of the diaphragm. The counteraction of the spring is such as to force the discs encompassing the diaphragm against the lower surfaces of the block 11. Flange 35 of disc 33 will thereupon seat at one of its sections. Within the aperture 16 of block 11 seating of the section of the disc provides a fulcrum for the lever enabling the lever plunger action of the diaphragm to take place. This fulcrum like engagement of the disc 33 with block 11 ensures proper seating at all times of at least a portion of the pump of the device, thereupon preventing any unusual stresses or strains upon the diaphragm such as might cause rupture thereto.

Upon priming of the instrument and during operation, fluid will enter the ports 24 through the action of the diaphragm and pumping elements, thereupon opening the intake valve 42. The opening and closing of the intake valve occur concurrently with the return of and movement out of battery of the pumping assembly. Simultaneously upon operation the check valve operates to eject fluids from the chamber 23 and to retain the same therein, thereby preventing necessity for priming each time the instrument is brought into operation.

Whereas the invention has been described in its preferred form, it is to be understood that various modifications in the size, shape and structure of the device may be made without departing from the spirit of the invention as set forth in the appended claims.

I claim:

1. A pumping device for anchored small craft and the like, which is adapted to operate upon the natural fluctuating pulsations of the wind, comprising: a housing having uppermost, central and lowermost portions, said housing portions being sealed together to define a pumping chamber, and intake and exhaust ports therefor; a diaphragm held adjacent the lower face of the uppermost housing portion; lever means attached to the diaphragm to deform same, said lever means impinging upon the lower face of the uppermost housing portion and extending upwardly through the uppermost portion of the housing; adjustable restraining means exteriorly connecting the lever means and outer face of the uppermost portion of the housing; and oscillatory wind gathering means rotatably joined to the lever means.

2. A fluid pumping device comprising: a housing, including uppermost, central and lowermost block portions stacked upon and sealed to each other, the block portions defining a pump chamber having intake and output channels opening into the pump chamber; a diaphragm in the pump chamber adjacent the lower face of the uppermost block portions; lever means engaging the diaphragm and extending in upright position through the uppermost block portion; tension means abutting the upper face of the uppermost block portion and urging the lever means into fulcrum contact with the lower face of the uppermost block portion; compression means adjustably connected to the lever means and said tension means to adjust pumping sensitivity of the device; and a wind gathering vane mounted coaxially and in extension of the lever means, said vane being freely rotatable on its axis to orient the vane with respect to prevailing winds.

3. The device according to claim 2 in which the vane comprises a sheet of semi-rigid material bent upon itself and having equal portions extending laterally outwardly of its axis.

4. A fluid pumping device comprising: a housing defining a pump chamber, said housing including uppermost, central and lowermost portions; a diaphragm within the chamber adjacent the lower face of the uppermost portion of the housing; a lever member connected to the diaphragm and extending upwardly through the uppermost portion of the housing, said lever member being in fulcrum contact with the lower face of the uppermost portion of the housing; restraining means in adjustable coaxial connection with the lever member and the exterior of the housing, said restraining means comprising tension means and an adjustable compressor member for the tension means, said tension means being adjustably compressed between the housing and the compressor member and said compressor member having slidably adjustable contact with the lever member for increasing and decreasing the pumping sensitivity of the pumping device.

References Cited in the file of this patent

UNITED STATES PATENTS

| | | |
|---|---|---|
| 11,559 | Pease | Aug. 22, 1851 |
| 1,973,486 | Jones | Sept. 11, 1934 |
| 2,151,172 | Villarreal | Mar. 21, 1939 |
| 2,418,699 | Cox | Apr. 8, 1947 |